United States Patent
Bateman et al.

(10) Patent No.: US 12,144,320 B2
(45) Date of Patent: Nov. 19, 2024

(54) ELECTRONIC ANIMAL IDENTIFICATION TAG READER SYNCHRONISATION

(71) Applicant: ALLFLEX AUSTRALIA PTY LTD, Queensland (AU)

(72) Inventors: Leigh Andrew Bateman, Queensland (AU); Benjamin Thomas John Wilkinson, Queensland (AU); Brian Antony Clayton, Queensland (AU)

(73) Assignee: ALLFLEX AUSTRALIA PTY LTD, Queensland (AU)

( * ) Notice: Subject to any disclaimer, the term of this patent is extended or adjusted under 35 U.S.C. 154(b) by 333 days.

(21) Appl. No.: 17/429,597

(22) PCT Filed: Feb. 8, 2019

(86) PCT No.: PCT/AU2019/050094
§ 371 (c)(1),
(2) Date: Aug. 9, 2021

(87) PCT Pub. No.: WO2020/160589
PCT Pub. Date: Aug. 13, 2020

(65) Prior Publication Data
US 2022/0125011 A1    Apr. 28, 2022

(51) Int. Cl.
*A01K 11/00* (2006.01)
*G01S 5/02* (2010.01)
(Continued)

(52) U.S. Cl.
CPC .......... *A01K 11/004* (2013.01); *A01K 11/008* (2013.01); *G01S 5/0252* (2013.01);
(Continued)

(58) Field of Classification Search
CPC ... A01K 11/004; A01K 11/008; G01S 5/0252; G01S 7/28; G01S 19/14; G01S 19/37; G01S 19/40; G01S 19/42
(Continued)

(56) References Cited

U.S. PATENT DOCUMENTS

| 85,575 A | 1/1869 | Mexworth |
| 377,588 A | 2/1888 | Walsh, Jr. |

(Continued)

FOREIGN PATENT DOCUMENTS

| AU | 199534570 | 10/1994 |
| AU | 2003239832 | 5/2002 |

(Continued)

OTHER PUBLICATIONS

Extended Search Report for European Patent Application No. 19914193.8, dated Aug. 30, 2022, 6 pages.
(Continued)

*Primary Examiner* — Kerri L McNally
*Assistant Examiner* — Thang D Tran
(74) *Attorney, Agent, or Firm* — Keith O'Doherty; Jenny Cromsigt (57) ABSTRACT

Approaches for synchronising electronic animal identification tag readers for reading electronic animal identification tags attached to animals Embodiments include using a pulse from a GNSS receiver, adjusting for an error between a reference cadence signal and a local cadence signal, and using a synchronisation signal.

12 Claims, 3 Drawing Sheets

(51) Int. Cl.
*G01S 7/28* (2006.01)
*G01S 19/14* (2010.01)
*G01S 19/37* (2010.01)
*G01S 19/40* (2010.01)
*G01S 19/42* (2010.01)

(52) U.S. Cl.
CPC ............... *G01S 7/28* (2013.01); *G01S 19/14* (2013.01); *G01S 19/37* (2013.01); *G01S 19/40* (2013.01); *G01S 19/42* (2013.01)

(58) Field of Classification Search
USPC ..................................................... 340/573.3
See application file for complete search history.

(56) References Cited

U.S. PATENT DOCUMENTS

| | | | |
|---|---|---|---|
| 584,121 | A | 6/1897 | Sanders |
| 818,783 | A | 4/1906 | Philippi |
| 823,079 | A | 6/1906 | Rais |
| 1,016,752 | A | 2/1912 | Leith |
| 1,188,510 | A | 6/1916 | Timson |
| 1,364,137 | A | 1/1921 | Pannier |
| 1,759,400 | A | 5/1930 | Hobbs |
| 1,843,314 | A | 2/1932 | Berntson et al. |
| 1,863,037 | A | 6/1932 | Archbold |
| 2,078,827 | A | 4/1937 | Ketchum |
| 2,420,020 | A | 5/1947 | Snell |
| 2,553,400 | A | 5/1951 | Blair |
| 2,570,048 | A | 10/1951 | Cooke et al. |
| 3,091,770 | A | 6/1963 | McMurray et al. |
| 3,261,243 | A | 7/1966 | Ellison |
| 3,596,541 | A | 8/1971 | Bieganski |
| 3,812,859 | A | 5/1974 | Murphy et al. |
| 3,884,100 | A | 5/1975 | Fideldy |
| 3,981,209 | A | 9/1976 | Caroff |
| 4,120,303 | A | 10/1978 | Villa-Massone et al. |
| 4,121,591 | A | 10/1978 | Hayes |
| 4,281,657 | A | 8/1981 | Ritchey |
| 4,323,183 | A | 4/1982 | Duchin |
| 4,399,535 | A * | 8/1983 | Southard ............... H04Q 1/4575 370/525 |
| 4,497,321 | A | 2/1985 | Fearing et al. |
| 4,516,577 | A | 5/1985 | Scott et al. |
| 4,531,520 | A | 7/1985 | Reggers et al. |
| 4,552,147 | A | 11/1985 | Gardner |
| 4,666,436 | A | 5/1987 | McDonald et al. |
| 4,672,966 | A | 6/1987 | Haas, Jr. |
| 4,696,119 | A | 9/1987 | Howe et al. |
| 4,716,899 | A | 1/1988 | Huenefeld et al. |
| 4,819,639 | A | 4/1989 | Gardner |
| 4,821,683 | A | 4/1989 | Veldman |
| 4,878,302 | A | 11/1989 | Jowsey |
| 4,943,294 | A | 7/1990 | Knapp |
| 5,022,253 | A | 6/1991 | Parlatore |
| 5,056,385 | A | 10/1991 | Petersen |
| 5,141,514 | A | 8/1992 | van Amelsfort |
| 5,154,721 | A | 10/1992 | Perez |
| 5,183,008 | A * | 2/1993 | Carrano ............... A01K 1/0023 119/840 |
| 5,267,464 | A | 12/1993 | Cleland |
| 5,509,291 | A | 4/1996 | Nilsson et al. |
| 5,651,791 | A | 7/1997 | Zavlodaver et al. |
| 5,778,820 | A | 7/1998 | van der Lely et al. |
| 6,007,548 | A | 12/1999 | Ritchey |
| 6,016,769 | A | 1/2000 | Forster |
| 6,043,748 | A | 3/2000 | Touchton et al. |
| 6,053,926 | A | 4/2000 | Luehrs |
| 6,095,915 | A | 8/2000 | Battista et al. |
| 6,099,482 | A | 8/2000 | Brune et al. |
| 6,100,804 | A | 8/2000 | Brady et al. |
| 6,113,539 | A * | 9/2000 | Ridenour ............... A61B 5/68 128/903 |
| 6,114,957 | A | 9/2000 | Westrick et al. |
| 6,145,225 | A | 11/2000 | Ritchey |
| 6,166,643 | A | 12/2000 | Janning et al. |
| 6,172,640 | B1 | 1/2001 | Durst et al. |
| 6,232,880 | B1 | 5/2001 | Anderson et al. |
| 6,235,036 | B1 | 5/2001 | Gardner et al. |
| 6,271,757 | B1 | 8/2001 | Touchton et al. |
| 6,297,739 | B1 | 10/2001 | Small |
| 6,310,553 | B1 | 10/2001 | Dance |
| 6,402,692 | B1 | 6/2002 | Morford |
| 6,497,197 | B1 | 12/2002 | Huisma |
| 6,502,060 | B1 | 12/2002 | Christian |
| 6,510,630 | B1 | 1/2003 | Gardner |
| 6,535,131 | B1 | 3/2003 | Bar-Shalom et al. |
| 6,569,092 | B1 | 5/2003 | Booker |
| 6,659,039 | B1 | 12/2003 | Larsen |
| 6,772,556 | B1 | 8/2004 | Liu |
| 6,868,804 | B1 | 3/2005 | Huisma et al. |
| 7,016,730 | B2 | 3/2006 | Ternes |
| 7,046,152 | B1 | 5/2006 | Peinetti et al. |
| 7,137,359 | B1 | 11/2006 | Braden |
| 7,296,539 | B2 | 11/2007 | Iljas |
| 7,380,518 | B2 | 6/2008 | Kates |
| 7,705,736 | B1 | 4/2010 | Kedziora |
| 7,772,979 | B2 | 8/2010 | Nehls |
| 7,843,350 | B2 | 11/2010 | Geissler et al. |
| 7,937,861 | B1 | 5/2011 | Zacher |
| 8,005,624 | B1 | 8/2011 | Starr |
| 8,266,990 | B1 | 9/2012 | Janson |
| 8,305,220 | B2 | 11/2012 | Gibson |
| 8,314,687 | B2 | 11/2012 | Yelle et al. |
| 8,478,389 | B1 | 7/2013 | Brockway et al. |
| 8,622,929 | B2 | 1/2014 | Wilson et al. |
| 8,763,557 | B2 | 7/2014 | Lipscomb et al. |
| 8,955,462 | B1 | 2/2015 | Golden et al. |
| 8,979,757 | B2 | 3/2015 | Mottram et al. |
| 9,215,862 | B2 | 12/2015 | Bladen et al. |
| 9,392,767 | B2 | 7/2016 | Johnson, III et al. |
| 9,392,946 | B1 | 7/2016 | Sarantos et al. |
| 9,449,487 | B1 | 9/2016 | Spitalny |
| 9,489,813 | B1 * | 11/2016 | Beigel ............... G08B 13/2417 |
| 9,648,849 | B1 | 5/2017 | Vivathana |
| 9,654,925 | B1 | 5/2017 | Solinsky et al. |
| 9,693,536 | B1 | 7/2017 | Dana |
| 9,717,216 | B1 | 8/2017 | Schlachta et al. |
| 9,743,643 | B1 | 8/2017 | Kaplan et al. |
| 9,848,577 | B1 | 12/2017 | Brandao et al. |
| 9,861,080 | B1 | 1/2018 | Hathway et al. |
| 10,004,204 | B2 | 6/2018 | Hayes et al. |
| 10,021,857 | B2 | 7/2018 | Bailey et al. |
| 10,039,263 | B2 | 8/2018 | Teychene et al. |
| 10,045,511 | B1 | 8/2018 | Yarden et al. |
| 10,064,391 | B1 | 9/2018 | Riley |
| 10,091,972 | B1 | 10/2018 | Jensen et al. |
| 10,123,297 | B1 | 11/2018 | Harney et al. |
| 10,231,442 | B1 | 3/2019 | Chang et al. |
| 10,242,547 | B1 | 3/2019 | Struhsaker et al. |
| 10,264,762 | B1 | 4/2019 | Lamb |
| 10,352,759 | B1 | 7/2019 | Jensen |
| 10,446,006 | B1 | 10/2019 | Johnson, Jr. et al. |
| 10,512,430 | B1 | 12/2019 | Hladio |
| 10,588,295 | B1 | 3/2020 | Riley |
| 10,628,756 | B1 | 4/2020 | Kuper et al. |
| 10,638,726 | B1 | 5/2020 | Makarychev et al. |
| 10,691,674 | B2 | 6/2020 | Leong et al. |
| 2001/0027751 | A1 | 10/2001 | van den Berg |
| 2002/0010390 | A1 * | 1/2002 | Guice .................... G16H 50/20 600/300 |
| 2002/0021219 | A1 | 2/2002 | Edwards |
| 2002/0031997 | A1 * | 3/2002 | Lawler, Jr. ......... G06K 19/0723 452/173 |
| 2002/0091326 | A1 | 7/2002 | Hashimoto et al. |
| 2002/0095828 | A1 | 7/2002 | Koopman et al. |
| 2002/0154015 | A1 | 10/2002 | Hixson |
| 2002/0158765 | A1 | 10/2002 | Pape et al. |
| 2003/0004652 | A1 | 1/2003 | Brunner et al. |
| 2003/0023517 | A1 | 1/2003 | Marsh et al. |
| 2003/0028327 | A1 | 2/2003 | Brunner et al. |
| 2003/0062001 | A1 | 4/2003 | Guldkula |
| 2003/0066491 | A1 | 4/2003 | Stampe |
| 2003/0144926 | A1 | 7/2003 | Bodin et al. |

(56) References Cited

U.S. PATENT DOCUMENTS

| | | |
|---|---|---|
| 2003/0146284 A1 | 8/2003 | Schmit et al. |
| 2003/0149526 A1 | 8/2003 | Zhou et al. |
| 2003/0177025 A1 | 9/2003 | Curkendall et al. |
| 2003/0201931 A1 | 10/2003 | Durst et al. |
| 2003/0208157 A1 | 11/2003 | Eidson et al. |
| 2003/0221343 A1 | 12/2003 | Volk et al. |
| 2003/0229452 A1 | 12/2003 | Lewis |
| 2004/0066298 A1 | 4/2004 | Schmitt et al. |
| 2004/0078390 A1 | 4/2004 | Saunders |
| 2004/0118920 A1 | 6/2004 | He |
| 2004/0123810 A1 | 7/2004 | Lorton et al. |
| 2004/0177011 A1 | 9/2004 | Ramsay et al. |
| 2004/0201454 A1 | 10/2004 | Waterhouse et al. |
| 2005/0010333 A1 | 1/2005 | Lorton et al. |
| 2005/0026181 A1 | 2/2005 | Davis et al. |
| 2005/0097997 A1 | 5/2005 | Hile |
| 2005/0108912 A1 | 5/2005 | Bekker |
| 2005/0115508 A1 | 6/2005 | Little |
| 2005/0128086 A1 | 6/2005 | Brown et al. |
| 2005/0139168 A1 | 6/2005 | Light et al. |
| 2005/0145187 A1 | 7/2005 | Gray |
| 2005/0200478 A1* | 9/2005 | Koch ............... G06Q 10/08 455/457 |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0038658 A1* | 2/2006 | Jarvis ............ G06K 19/0701 340/572.1 |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser et al. |
| 2006/0117619 A1 | 6/2006 | Costantini |
| 2006/0155172 A1 | 7/2006 | Rugg |
| 2006/0170561 A1 | 8/2006 | Eyal |
| 2006/0173367 A1 | 8/2006 | Stuart et al. |
| 2006/0185605 A1 | 8/2006 | Renz et al. |
| 2006/0201436 A1 | 9/2006 | Kates |
| 2006/0207515 A1 | 9/2006 | Palett |
| 2006/0241521 A1 | 10/2006 | Cohen |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1* | 1/2007 | Trost ............... G08B 13/2402 340/573.3 |
| 2007/0021660 A1 | 1/2007 | Delonzor et al. |
| 2007/0027375 A1 | 2/2007 | Melker et al. |
| 2007/0027377 A1 | 2/2007 | Delonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Fantin et al. |
| 2007/0069899 A1 | 3/2007 | Shih et al. |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0016990 A1 | 1/2008 | Milnes et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson et al. |
| 2008/0146890 A1 | 6/2008 | LeBoeuf et al. |
| 2008/0171126 A1 | 7/2008 | Adams et al. |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0211969 A1* | 9/2008 | Simon ................ H04H 20/18 348/E5.003 |
| 2008/0215484 A1 | 9/2008 | Oldham |
| 2008/0216765 A1* | 9/2008 | Kates ................ G01S 13/86 340/573.3 |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2009/0009289 A1* | 1/2009 | Simon ................ A01K 11/006 340/10.1 |
| 2009/0009388 A1 | 1/2009 | Wangrud |
| 2009/0020613 A1 | 1/2009 | Chang et al. |
| 2009/0025651 A1 | 1/2009 | Lalor |
| 2009/0058730 A1 | 3/2009 | Geissler et al. |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0255484 A1 | 10/2009 | Muelken |
| 2009/0312667 A1 | 12/2009 | Utsunomiya et al. |
| 2010/0018363 A1 | 1/2010 | Chervenak et al. |
| 2010/0030036 A1 | 2/2010 | Mottram et al. |
| 2010/0045468 A1 | 2/2010 | Geissler |
| 2010/0113902 A1 | 5/2010 | Hete et al. |
| 2010/0139575 A1 | 6/2010 | Duncan et al. |
| 2010/0160809 A1 | 6/2010 | Laurence et al. |
| 2010/0175625 A1 | 7/2010 | Klenotiz |
| 2010/0217102 A1 | 8/2010 | LeBoeuf et al. |
| 2010/0250198 A1 | 9/2010 | Lorton et al. |
| 2010/0289639 A1 | 11/2010 | Gibson et al. |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Maltz et al. |
| 2011/0018717 A1 | 1/2011 | Takahashi et al. |
| 2011/0041367 A1 | 2/2011 | Bladen et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0178423 A1 | 7/2011 | Hatch |
| 2011/0192356 A1* | 8/2011 | Loosveld ............ A01K 1/0023 49/31 |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete |
| 2012/0009943 A1 | 1/2012 | Greenberg et al. |
| 2012/0032788 A1* | 2/2012 | Gravelle ............ G06K 7/10069 340/10.2 |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0236690 A1 | 9/2012 | Rader |
| 2012/0291715 A1 | 11/2012 | Jiang et al. |
| 2012/0299731 A1 | 11/2012 | Triener |
| 2012/0325153 A1 | 12/2012 | Mostert |
| 2012/0326862 A1 | 12/2012 | Kwak et al. |
| 2012/0326874 A1 | 12/2012 | Kwak et al. |
| 2013/0006065 A1 | 1/2013 | Yanai et al. |
| 2013/0014706 A1 | 1/2013 | Menkes |
| 2013/0046170 A1 | 2/2013 | Haynes |

(56) References Cited

U.S. PATENT DOCUMENTS

| | | | |
|---|---|---|---|
| 2013/0092099 A1* | 4/2013 | Hardi | A01K 29/005 119/721 |
| 2013/0113622 A1 | 5/2013 | Pratt | |
| 2013/0119142 A1 | 5/2013 | McCoy et al. | |
| 2013/0175347 A1 | 7/2013 | Decaluwe et al. | |
| 2013/0181834 A1* | 7/2013 | Bentley | G08B 13/2462 340/539.13 |
| 2013/0192526 A1 | 8/2013 | Mainini | |
| 2013/0211773 A1 | 8/2013 | Loeschinger | |
| 2013/0222141 A1 | 8/2013 | Rhee et al. | |
| 2013/0237778 A1 | 9/2013 | Rouquette et al. | |
| 2013/0239904 A1 | 9/2013 | Kim et al. | |
| 2013/0239907 A1 | 9/2013 | Laurence et al. | |
| 2013/0265165 A1 | 10/2013 | So et al. | |
| 2013/0282295 A1 | 10/2013 | White et al. | |
| 2013/0285815 A1 | 10/2013 | Jones, II | |
| 2014/0073486 A1 | 3/2014 | Ahmed et al. | |
| 2014/0122488 A1 | 5/2014 | Jung et al. | |
| 2014/0123912 A1 | 5/2014 | Menkes et al. | |
| 2014/0135596 A1 | 5/2014 | LeBoeuf et al. | |
| 2014/0135631 A1 | 5/2014 | Brumback et al. | |
| 2014/0171762 A1 | 6/2014 | LeBoeuf et al. | |
| 2014/0174376 A1 | 6/2014 | Touchton et al. | |
| 2014/0196673 A1 | 7/2014 | Menkes et al. | |
| 2014/0230755 A1 | 8/2014 | Trenkle et al. | |
| 2014/0232541 A1 | 8/2014 | Trenkle et al. | |
| 2014/0253709 A1 | 9/2014 | Bresch et al. | |
| 2014/0261235 A1 | 9/2014 | Rich et al. | |
| 2014/0267299 A1 | 9/2014 | Couse | |
| 2014/0275824 A1 | 9/2014 | Couse | |
| 2014/0276089 A1 | 9/2014 | Kirenko et al. | |
| 2014/0290013 A1 | 10/2014 | Eidelman et al. | |
| 2014/0302783 A1 | 10/2014 | Aiuto et al. | |
| 2014/0331942 A1 | 11/2014 | Sarazyn | |
| 2014/0333439 A1 | 11/2014 | Downing et al. | |
| 2014/0347184 A1 | 11/2014 | Triener | |
| 2014/0352632 A1 | 12/2014 | McLaughlin | |
| 2014/0368338 A1 | 12/2014 | Rettedal et al. | |
| 2015/0025394 A1 | 1/2015 | Hong et al. | |
| 2015/0039239 A1 | 2/2015 | Shuler et al. | |
| 2015/0057963 A1 | 2/2015 | Zakharov et al. | |
| 2015/0097668 A1 | 4/2015 | Toth | |
| 2015/0099472 A1 | 4/2015 | Ickovic | |
| 2015/0100245 A1 | 4/2015 | Huang et al. | |
| 2015/0107519 A1 | 4/2015 | Rajkondawar et al. | |
| 2015/0107522 A1 | 4/2015 | Lamb | |
| 2015/0109130 A1 | 4/2015 | Rajkondawar et al. | |
| 2015/0122893 A1 | 5/2015 | Warther | |
| 2015/0128873 A1 | 5/2015 | Prescott et al. | |
| 2015/0130617 A1 | 5/2015 | Triener | |
| 2015/0148811 A1 | 5/2015 | Swope et al. | |
| 2015/0157435 A1 | 6/2015 | Chasins et al. | |
| 2015/0182322 A1 | 7/2015 | Couse et al. | |
| 2015/0245592 A1 | 9/2015 | Sibbald et al. | |
| 2015/0282457 A1 | 10/2015 | Yarden | |
| 2015/0334994 A1 | 11/2015 | Prasad | |
| 2015/0342143 A1 | 12/2015 | Stewart | |
| 2015/0351885 A1 | 12/2015 | Kool et al. | |
| 2015/0358938 A1* | 12/2015 | Richley | H04W 64/006 455/456.1 |
| 2015/0366166 A1 | 12/2015 | Mueller | |
| 2016/0000045 A1 | 1/2016 | Funaya et al. | |
| 2016/0021506 A1 | 1/2016 | Bonge, Jr. | |
| 2016/0058379 A1 | 3/2016 | Menkes et al. | |
| 2016/0066546 A1 | 3/2016 | Borchersen et al. | |
| 2016/0100802 A1 | 4/2016 | Newman | |
| 2016/0106064 A1 | 4/2016 | Bladen et al. | |
| 2016/0113524 A1 | 4/2016 | Gross et al. | |
| 2016/0120154 A1 | 5/2016 | Hill et al. | |
| 2016/0128637 A1 | 5/2016 | LeBoeuf et al. | |
| 2016/0135431 A1 | 5/2016 | Siegel | |
| 2016/0148086 A1 | 5/2016 | Clarke et al. | |
| 2016/0150362 A1 | 5/2016 | Shaprio et al. | |
| 2016/0151013 A1 | 6/2016 | Atallah et al. | |
| 2016/0165851 A1 | 6/2016 | Harty et al. | |
| 2016/0165852 A1 | 6/2016 | Goldfain | |
| 2016/0166761 A1 | 6/2016 | Piehl et al. | |
| 2016/0198957 A1 | 7/2016 | Arditi et al. | |
| 2016/0210841 A1 | 7/2016 | Huang et al. | |
| 2016/0213317 A1 | 7/2016 | Richardson et al. | |
| 2016/0278712 A1 | 9/2016 | Sagara et al. | |
| 2016/0286757 A1 | 10/2016 | Armstrong | |
| 2016/0287108 A1 | 10/2016 | Wei et al. | |
| 2016/0317049 A1 | 11/2016 | LeBoeuf et al. | |
| 2016/0345881 A1 | 12/2016 | Sarantos et al. | |
| 2016/0360733 A1 | 12/2016 | Triener | |
| 2016/0367495 A1 | 12/2016 | Miller et al. | |
| 2017/0000090 A1 | 1/2017 | Hall | |
| 2017/0006836 A1 | 1/2017 | Torres | |
| 2017/0042119 A1 | 2/2017 | Garrity | |
| 2017/0067770 A1 | 3/2017 | Sun | |
| 2017/0079247 A1 | 3/2017 | Womble et al. | |
| 2017/0095206 A1 | 4/2017 | Leib et al. | |
| 2017/0142937 A1* | 5/2017 | De Groot | A01K 1/12 |
| 2017/0156288 A1 | 6/2017 | Singh | |
| 2017/0164905 A1 | 6/2017 | Gumiero | |
| 2017/0171849 A1* | 6/2017 | Bolin | H04L 43/10 |
| 2017/0193208 A1 | 7/2017 | Ashley et al. | |
| 2017/0196203 A1 | 7/2017 | Huisma et al. | |
| 2017/0202185 A1 | 7/2017 | Trumbull et al. | |
| 2017/0245797 A1 | 8/2017 | Quinn | |
| 2017/0258039 A1 | 9/2017 | Lauterbach | |
| 2017/0272842 A1 | 9/2017 | Touma | |
| 2017/0280675 A1 | 10/2017 | MacNeil et al. | |
| 2017/0280688 A1 | 10/2017 | Deliou et al. | |
| 2017/0318781 A1 | 11/2017 | Rollins et al. | |
| 2017/0360004 A1 | 12/2017 | Carver | |
| 2017/0372583 A1 | 12/2017 | Lamkin et al. | |
| 2018/0000045 A1 | 1/2018 | Bianchi et al. | |
| 2018/0007863 A1 | 1/2018 | Bailey et al. | |
| 2018/0014512 A1 | 1/2018 | Arabani et al. | |
| 2018/0027772 A1 | 2/2018 | Gordon et al. | |
| 2018/0055016 A1 | 3/2018 | Hsieh et al. | |
| 2018/0064068 A1 | 3/2018 | McKee et al. | |
| 2018/0070559 A1 | 3/2018 | So | |
| 2018/0098522 A1 | 4/2018 | Steinfort | |
| 2018/0102863 A1* | 4/2018 | Royle | H03L 7/00 |
| 2018/0110205 A1 | 4/2018 | Czarnecky et al. | |
| 2018/0113498 A1 | 4/2018 | Cronin et al. | |
| 2018/0131074 A1 | 5/2018 | Wilkinson et al. | |
| 2018/0132455 A1 | 5/2018 | Pradeep et al. | |
| 2018/0136307 A1* | 5/2018 | Turner | G01S 5/0294 |
| 2018/0146645 A1 | 5/2018 | Arbel | |
| 2018/0206455 A1 | 7/2018 | Thiex et al. | |
| 2018/0242860 A1 | 8/2018 | LeBoeuf et al. | |
| 2018/0249683 A1 | 9/2018 | Borchersen et al. | |
| 2018/0260976 A1 | 9/2018 | Watanabe et al. | |
| 2018/0271058 A1 | 9/2018 | Valdez | |
| 2018/0279582 A1 | 10/2018 | Yajima et al. | |
| 2018/0288968 A1 | 10/2018 | Cisco | |
| 2018/0295809 A1 | 10/2018 | Yajima et al. | |
| 2018/0303425 A1 | 10/2018 | Wordham et al. | |
| 2018/0310526 A1 | 11/2018 | Birch et al. | |
| 2018/0325382 A1* | 11/2018 | Brandao | A01K 29/005 |
| 2018/0332989 A1 | 11/2018 | Chiu et al. | |
| 2018/0333244 A1 | 11/2018 | Hanks et al. | |
| 2019/0008118 A1 | 1/2019 | Keegan | |
| 2019/0008124 A1 | 1/2019 | Komatsu et al. | |
| 2019/0029226 A1 | 1/2019 | Triener | |
| 2019/0053469 A1 | 2/2019 | Mardirossian | |
| 2019/0053470 A1 | 2/2019 | Singh et al. | |
| 2019/0059335 A1 | 2/2019 | Crider, Jr. et al. | |
| 2019/0059337 A1 | 2/2019 | Robbins | |
| 2019/0059741 A1 | 2/2019 | Crider, Jr. et al. | |
| 2019/0069512 A1 | 3/2019 | Eriksson et al. | |
| 2019/0075945 A1 | 3/2019 | Strassburger et al. | |
| 2019/0082654 A1 | 3/2019 | Robbins | |
| 2019/0090754 A1 | 3/2019 | Brandao et al. | |
| 2019/0108868 A1* | 4/2019 | Torng | G11C 11/02 |
| 2019/0110433 A1 | 4/2019 | Myers | |
| 2019/0110436 A1 | 4/2019 | Gardner et al. | |
| 2019/0125509 A1 | 5/2019 | Hotchkin | |
| 2019/0130728 A1 | 5/2019 | Struhsaker et al. | |
| 2019/0133086 A1 | 5/2019 | Katz et al. | |

(56) References Cited

U.S. PATENT DOCUMENTS

| | | |
|---|---|---|
| 2019/0159428 A1 | 5/2019 | Bolen |
| 2019/0166802 A1 | 6/2019 | Seltzer et al. |
| 2019/0183091 A1 | 6/2019 | Betts-LaCroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2019/0387711 A1 | 12/2019 | Flennert et al. |
| 2020/0015740 A1 | 1/2020 | Alnofeli et al. |
| 2020/0037886 A1 | 2/2020 | Greer et al. |
| 2020/0045932 A1* | 2/2020 | Knight .................. G01S 13/878 |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0170222 A1 | 6/2020 | Gotts |
| 2020/0178504 A1 | 6/2020 | Moss et al. |
| 2020/0178505 A1 | 6/2020 | Womble et al. |
| 2020/0178800 A1 | 6/2020 | Geissler et al. |
| 2020/0205381 A1 | 7/2020 | Wernimont et al. |
| 2020/0229391 A1 | 7/2020 | De Groot |
| 2020/0229707 A1 | 7/2020 | Donnelly |
| 2020/0242551 A1 | 7/2020 | Lau et al. |
| 2020/0281151 A1 | 9/2020 | Schmidt |
| 2022/0020051 A1 | 1/2022 | Aruga et al. |

FOREIGN PATENT DOCUMENTS

| | | |
|---|---|---|
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| BR | 8701673 | 3/2009 |
| BR | 11201201890 | 1/2011 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CN | 1989895 | 7/2007 |
| CN | 101196978 A | 6/2008 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204305813 | 5/2015 |
| CN | 204331349 | 5/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978 | 12/2005 |
| DE | 202010008325 | 2/2012 |
| DE | 20201301107 | 1/2014 |
| DE | 202016101289 | 4/2016 |
| DK | 140001 | 11/1979 |
| EP | 55127 | 6/1982 |
| EP | 125915 | 11/1984 |
| EP | 0499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2453733 | 5/2012 |
| EP | 2465344 | 6/2012 |
| EP | 2488237 | 8/2012 |
| EP | 2528431 | 12/2012 |
| EP | 2534945 | 12/2012 |
| EP | 2657889 | 10/2013 |
| EP | 2664234 | 11/2013 |
| EP | 2728995 | 5/2014 |

(56) References Cited

FOREIGN PATENT DOCUMENTS

| | | |
|---|---|---|
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| EP | 4001951 A1 | 5/2022 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 12392138 | 2/2004 |
| GB | 2469326 | 10/2010 |
| GB | 2554636 | 9/2016 |
| GB | 2553762 | 3/2018 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 101747418 | 1/2011 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 199822028 | 5/1998 |
| WO | 1998039475 | 9/1998 |
| WO | 1999017658 | 4/1999 |
| WO | 2000062263 | 4/1999 |
| WO | 9945761 | 9/1999 |
| WO | 2000013393 | 3/2000 |
| WO | 2000061802 | 10/2000 |
| WO | 2001033302 A2 | 5/2001 |
| WO | 2001033950 | 5/2001 |
| WO | 2001087054 | 11/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005034617 A1 | 4/2005 |
| WO | 2005104930 | 4/2005 |
| WO | 2005073408 | 8/2005 |
| WO | 2005082132 A2 | 9/2005 |
| WO | 2006021855 | 3/2006 |
| WO | 20060036567 A1 | 4/2006 |
| WO | 2006134197 | 12/2006 |
| WO | 2006135265 | 12/2006 |
| WO | 2007034211 | 3/2007 |
| WO | 2007095684 | 8/2007 |
| WO | 2007122375 | 11/2007 |
| WO | 200801803 A2 | 2/2008 |
| WO | 2008033042 | 3/2008 |
| WO | 2008041839 A1 | 4/2008 |
| WO | 2008052298 | 5/2008 |
| WO | 2008075974 | 6/2008 |
| WO | WO 2008/108816 | 9/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011076886 | 6/2011 |
| WO | 2011154949 | 12/2011 |
| WO | 2012071670 | 6/2012 |
| WO | 2013008115 | 1/2013 |
| WO | 2013038326 | 3/2013 |
| WO | 2013082227 | 6/2013 |
| WO | 2015001537 | 7/2013 |
| WO | 2013118121 | 8/2013 |

(56) References Cited

FOREIGN PATENT DOCUMENTS

| | | |
|---|---|---|
| WO | 2015024050 | 8/2013 |
| WO | 2013179020 | 12/2013 |
| WO | 2013190423 | 12/2013 |
| WO | 2014020463 | 2/2014 |
| WO | 2014095759 | 6/2014 |
| WO | 2014107766 | 7/2014 |
| WO | 2014118788 | 8/2014 |
| WO | 2014125250 | 8/2014 |
| WO | 2016027271 | 8/2014 |
| WO | 2014140148 | 9/2014 |
| WO | 2014141084 | 9/2014 |
| WO | 2014194383 | 12/2014 |
| WO | 2014197631 | 12/2014 |
| WO | 2014199363 | 12/2014 |
| WO | 2015009167 | 1/2015 |
| WO | 2015030832 | 3/2015 |
| WO | 2015055709 | 4/2015 |
| WO | 2015086338 | 6/2015 |
| WO | 2016207844 | 6/2015 |
| WO | 2015107354 | 7/2015 |
| WO | 2017001717 | 7/2015 |
| WO | 2017031532 | 8/2015 |
| WO | 2015140486 | 9/2015 |
| WO | 2015158787 | 10/2015 |
| WO | 2015175686 | 11/2015 |
| WO | 2015176027 | 11/2015 |
| WO | 2015197385 | 12/2015 |
| WO | 2016037190 | 3/2016 |
| WO | 2017149049 | 3/2016 |
| WO | 2016053104 | 4/2016 |
| WO | 2016108187 | 7/2016 |
| WO | 2016166748 | 10/2016 |
| WO | 2017001538 | 1/2017 |
| WO | 2017027551 | 2/2017 |
| WO | 2017037479 | 3/2017 |
| WO | 2017066813 | 4/2017 |
| WO | 2017089289 | 6/2017 |
| WO | 2017096256 | 6/2017 |
| WO | 2017121834 | 7/2017 |
| WO | 2018006965 | 1/2018 |
| WO | 2018011736 | 1/2018 |
| WO | 2018019742 | 2/2018 |
| WO | 2020022543 | 7/2018 |
| WO | 2018172976 | 9/2018 |
| WO | 2020060248 | 9/2018 |
| WO | 2018203203 | 11/2018 |
| WO | 2019009717 | 1/2019 |
| WO | 2019025138 | 2/2019 |
| WO | 2019046216 | 3/2019 |
| WO | 2019048521 A1 | 3/2019 |
| WO | 2019058752 | 3/2019 |
| WO | 2019071222 | 4/2019 |
| WO | 2019132803 | 7/2019 |
| WO | 2019207561 | 10/2019 |
| WO | 2019226100 A1 | 11/2019 |
| WO | 2019235942 | 12/2019 |
| WO | 2019245978 | 12/2019 |
| WO | 2020003310 | 1/2020 |
| WO | 2020096528 | 5/2020 |
| WO | 2020140013 | 7/2020 |

OTHER PUBLICATIONS

"Frequency-hopping spread spectrum," Wikipedia, Jan. 10, 2019, 6 pages [retrieved online from: en.wikipedia.org/w/index.php?title=Frequency-hopping_spread_spectrum&oldid=877667237].

Roche "Time Synchronization in Wireless Networks," Washington University in St. Luis, Apr. 23, 2006, 11 pages [retrieved online from www.cse.wustl.edu/~jain/cse574-06/ftp/time_sync/index.html].

International Search Report and Written Opinion for International (PCT) Patent Application No. PCT/AU2019/050094, dated Apr. 15, 2019, 7 pages.

International Preliminary Report on Patentability for International (PCT) Patent Application No. PCT/AU2019/050094, dated Jun. 4, 2021, 63 pages.

Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.

Steensels, Machteld; Maltz, Ephraim; Bahr, Claudia; Berckmans, Daniel; Antler, Aharon; et al., Towards practical application of sensors for monitoring animal health: The effect of post-calving health problems on rumination duration, activity and milk yield, the Journal of Dairy Research; Cambridge vol. 84, Iss. 2, (May 2017): 132-138.

Clark, C., Lyons, N., Millapan, L., Talukder, S., Cronin, G., Kerrisk, K., Garcia, S. (2015), Rumination and activity levels as predictors of calving for dairy cows, Animal, 9(4), 691-695.

K. Koyama, T. Koyama, M. Sugimoto, N. Kusakari, R. Miura, K. Yoshioka, M. Hirako, Prediction of calving time in Holstein dairy cows by monitoring the ventral tail base surface temperature, the Veterinary Journal, vol. 240, 2018, pp. 1-5, ISSN 1090-0233.

L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.

S. Benaissa, F.A.M. Tuytfens, D. Plets, J. Trogh, L. Martens, L. Vandaele, W. Joseph, B. Sonck, Calving and estrus detection in dairy cattle using a combination of indoor localization and accelerometer sensors, Computers and Electronics in Agriculture, vol. 168, 2020, 105153, ISSN 0168-1699.

N. Soriani, E. Trevisi, L. Calamari, Relationships between rumination time, metabolic conditions, and health status in dairy cows during the transition period, Journal of Animal Science, vol. 90, Issue 12, Dec. 2012, pp. 4544-4554.

The role of sensors, big data and machine learning in modern animal farming; Suresh Neethirajan; Received in revised form Jun. 30, 2020; Accepted Jul. 3, 2020 Sensing and Bio-Sensing Research 29 (2020) 100367 2214-1804/ © 2020 the Author. Published by Elsevier B.V.

A Review on Determination of Computer Aid Diagnosis and/or Risk Factors Using Data Mining Methods in Veterinary Field Pinar Cihan, Erhan Gökçe, Oya Kalipsiz; Tekirdağ Namlk Kemal University, Corlu Faculty of Engineering, Department of Computer Engineering, Tekirdağ, Turkey. 2019

Big Data Analytics and Precision Animal Agriculture Symposium: Data to decisions B. J. White, D. E. Amrine, and R. L. Larson Beef Cattle Institute, Kansas State University, Manhattan, KS; © The Author(s) 2018. Published by Oxford University Press on behalf of American Society of Animal Science.

Gasteiner, J.; Boswerger, B.; Guggenberger, T., Practical use of a novel ruminal sensor on dairy farms, Praktische Tierarzt 2012 vol. 93 No. 8 pp. 730 . . . 739 ref.45.

Drying up Cows and the Effect of Different Methods Upon Milk Production; Ralph Wayne, C. H. Eckles, and W. E. Peterson; Division of Dairy Husbandry, University of Minnesota, St. Paul; Research-Articlel vol. 16, Issue 1, p. 69-78, Jan. 1, 1933.

Eagan, B. H., B. Eagan, and A. Protopopova. "Behaviour Real-Time spatial tracking identification (BeRSTID) used for cat behaviour monitoring in an animal shelter." Scientific reports 12.1 (2022): 17585.

Garrido-Jurado, Sergio, et al. "Automatic generation and detection of highly reliable fiducial markers under occlusion." Pattern Recognition 47.6 (2014): 2280-2292.

Steve Nadis. "Invisible machine-readable labels that identify and track objects" Retrieved online on Sep. 3, 2023. URL: https://www.wevolver.com/article/invisible-machine-readable-labelsthat-ldentify-and-track-objects.

Prandini et al., Comparison of infectious bursa! disease live vaccines and a HVT-IBD vector vaccine and their effects on the immune system of commercial layer pullets. Avian Pathology. Mar. 17, 2016, vol. 45, pp. 114-125; abstract; p. 117, col. 1, para 2; p. 117, col. 2, para 1; p. 117, col. 2, para 2; p. 118, col. 1, para 2; p. 123, col. 1, para 1; p. 123, col. 1, para 2; p. 123, col. 2, para 3; Table 1.

(56) References Cited

OTHER PUBLICATIONS

Muniz et al., Molecular epidemiologic survey of infectious bursal disease viruses in broiler farms raised under different vaccination programs. Journal of Applied Poultry Research. 2018, vol. 27, pp. 253-261; abstract.

* cited by examiner

ELECTRONIC ANIMAL IDENTIFICATION TAG READER SYNCHRONISATION

CROSS REFERENCE TO RELATED APPLICATIONS

This application is a national stage application under 35 U.S.C. 371 and claims the benefit of PCT Application No. PCT/AU2019/050094 having an international filing date of 8 Feb. 2019, which designated the United States, the contents of which are incorporated herein by reference in its entirety.

FIELD

This relates to synchronising electronic animal identification tag readers for reading electronic animal identification tags attached to animals.

BACKGROUND

Electronic animal identification tags can be used to identify animals. A tag is securely attached to an animal, often to the animal's ear. By reading the tag, the animal can be uniquely identified. Readers are located in certain areas to read the tags of animals.

SUMMARY

In a first embodiment, there is provided a method, comprising: receiving a pulse from a GNSS receiver; wirelessly receiving a synchronisation signal from a master reader; selectively determining, based on the synchronisation signal, that a cadence is to be synchronised using the pulse; calculating a transmit period and a receive period based on the pulse; during the transmit period, transmitting a signal to an electronic tag attached to an animal; and during the receive period, monitoring for a received signal from the electronic tag attached to the animal; wherein the method is performed by an electronic animal identification tag reader configured to read an electronic animal identification tag attached to an animal; wherein calculating the transmit period and the receive period based on the pulse comprises: synchronising the cadence based on the pulse, where a first part of the cadence corresponds to the transmit period and a second part of the cadence corresponds to the receive period.

In a second example embodiment, there is provided an electronic animal identification tag reader comprising: a GNSS receiver configured to generate a pulse; a synchronisation signal receiver module configured to wirelessly receive a synchronisation signal from a master reader; a processor configured to selectively determine, based on the synchronisation signal, that a cadence is to be synchronised using the pulse; a cadence calculation module configured to calculate a transmit period and a receive period based on the pulse; a signal transmitter module configured to transmit a signal to an electronic tag attached to an animal during the transmit period; and a signal receiver module configured to monitor for a received signal from the electronic tag attached to the animal during the receive period; wherein the cadence calculation module being configured to calculate a transmit period and a receive period based on the pulse comprises the cadence calculation module being configured to: synchronise the cadence based on the pulse, where a first part of the cadence corresponds to the transmit period and a second part of the cadence corresponds to the receive period.

In a third example embodiment, there is provided a method, comprising: receiving a reference cadence signal; generating a local cadence signal at a local cadence signal generator, the local cadence signal corresponding to a transmit period in which a signal is transmitted to an electronic animal identification tag and a receive period in which a signal from the electronic animal identification tag is monitored; determining an error between the reference cadence signal and the local cadence signal; and adjusting the local cadence signal generator based on the error to minimise the difference between the reference cadence signal and the local cadence signal; wherein the method is performed by an electronic animal identification tag reader configured to read an electronic animal identification tag attached to an animal.

In a fourth example embodiment, there is provided an electronic animal identification tag reader comprising: a cadence signal receiver configured to receive a reference cadence signal; a local cadence signal generator configured to generate a local cadence signal, the local cadence signal corresponding to a transmit period in which a signal is transmitted to an electronic animal identification tag and a receive period in which a signal from the electronic animal identification tag is monitored; an error calculation module configured to determine an error between the reference cadence signal and the local cadence signal; and an error adjustment module configured to adjust the local cadence signal generator based on the error to minimise the difference between the reference cadence signal and the local cadence signal.

In a fifth example embodiment, there is provided a method for reading an electronic tag attached to an animal, comprising: generating a synchronisation signal; encoding the synchronisation signal to generate an encoded synchronisation signal; and wirelessly transmitting the encoded synchronisation signal to one or more slave readers; wherein the method is performed by a master reader in communication with the one or more slave readers, each slave reader being an electronic animal identification tag reader configured to read an electronic animal identification tag attached to an animal.

In a sixth example embodiment, there is provided a reader comprising: a synchronisation signal generator configured to generate a synchronisation signal; a synchronisation signal encoder module configured to encode the synchronisation signal to generate an encoded synchronisation signal; and a synchronisation signal transmission module configured to wirelessly transmit the encoded synchronisation signal to one or more slave readers; wherein the reader is a master reader in communication with the one or more slave readers, each slave reader being an electronic animal identification tag reader configured to read an electronic animal identification tag attached to an animal.

In a seventh example embodiment, there is provided a method, comprising: wirelessly receiving an encoded synchronisation signal from a master reader; decoding the encoded synchronisation signal to obtain a decoded synchronisation signal; synchronising a cadence based on the decoded synchronisation signal; and operating according to the cadence; wherein the method is performed by a slave reader, the slave reader in communication with a master reader, the slave reader being an electronic animal identification tag reader configured to read an electronic animal identification tag attached to an animal.

In an eighth example embodiment, there is provided an electronic animal identification tag reader comprising: a synchronisation signal receiver module configured to wirelessly receive an encoded synchronisation signal from a master reader; a synchronisation signal decoding module configured to decode the encoded synchronisation signal to obtain a decoded synchronisation signal; and a cadence synchronisation module configured to synchronise a cadence based on the decoded synchronisation signal; wherein the reader is configured to read an electronic animal identification tag attached to an animal according to the cadence.

BRIEF DESCRIPTION OF THE DRAWINGS

The invention is described by way of example with reference to the drawings, which show some embodiments of the invention. However, these are provided for illustration only. The invention is not limited to the particular details of the drawings and the corresponding description.

DETAILED DESCRIPTION

In some embodiments, there are provided approaches for synchronising readers with each other. Synchronising may mean that each reader enters a transmit mode around a same time and enters a receive mode around the same time.

System

Figure 1:
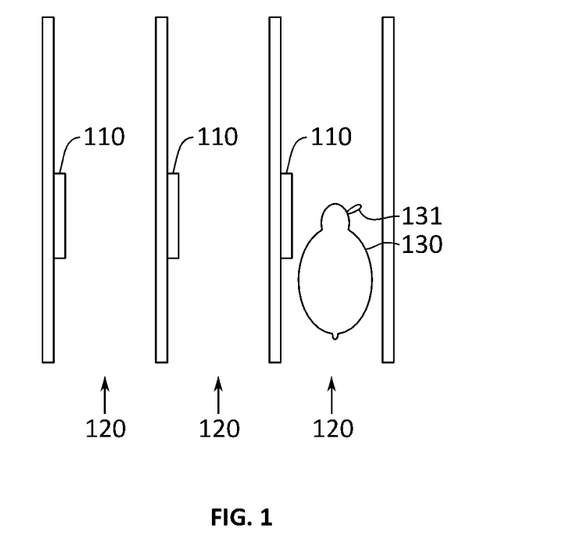
FIG. 1 shows an example reader system in which electronic animal tag readers are synchronised.

FIG. 1 shows an example reader system in which electronic animal tag readers are synchronised.

The system has a number of electronic animal tag readers 110 distributed around an area, such as a stockyard. Each electronic animal tag reader may be associated with a race 120 through which animals can pass. The races 120 may be at a gateway between the same area to improve the throughput of animals through the areas.

In some cases, readers 110 are widely distributed through an area, and may be be spaced up to hundreds of metres apart. For example, in a series of pens, one or more readers 110 may be located at each entrance and exit.

In use, animals 130 pass one or more of the readers 110. Electronic animal identification tags 131 attached to each animal (such as to the ear of each animal) are read by one or more of the readers 110. This allows the reader system to identify and monitor the identity and location of animals throughout the area.

The tags 131 are read by a reader 110 transmitting an excitation signal during a transmit mode. When a tag receives the excitation signal, it is energised and so transmits an identifier. The identifier may be a 96-bit code which is unique to the animal. If there are multiple tags 131 attached to the same animal, each tag 131 may use the same identifier. This identifier is received by one or more readers 110 during the readers' receive mode.

The excitation signal is relatively high powered compared to the identifier transmission. In practice, if an excitation signal is being generated by a reader 110, it may be impossible for a reader 110 (either the same reader or a different reader) to receive the identifier. To avoid this, the readers 110 are synchronised so as to enter a transmit mode and a receive mode at roughly the same time.

One of the readers is designated as a master reader 111 and the remaining readers 110 are designated as slave readers. The master reader 111 is configured to set the cadence for each reader 110. That is, the master reader 111 determines when the readers 110 should enter a transmit mode and when the readers 110 should enter a receive mode. This occurs in part by the master reader 111 sending a wireless synchronisation signal to the slave readers. A master reader 111 may be selected to be roughly in the middle of the readers 110 or to have a good wireless communication link to minimise transmission time. The master reader 111 may otherwise operate in the same way as the other readers 110.

In addition, each reader 110 may maintain local cadence generator. This can be used for cadence between synchronisation signals, or if the master reader 111 is unable to send a synchronisation signal.

Due to this synchronisation signal, the readers 110 are in a transmit mode and a receive mode at roughly the same time. For example, there may be a range of about 250 µs around which each reader 110 enters the transmit mode or each reader 110 enters the receive mode.

In some cases, one or more of the readers 110 may be a relay, which transmits the synchronisation signal from the master reader 111 to further slave readers 110 which are not in a communication range of the master reader 111.

Synchronising Using a Synchronisation Signal

Figure 2:
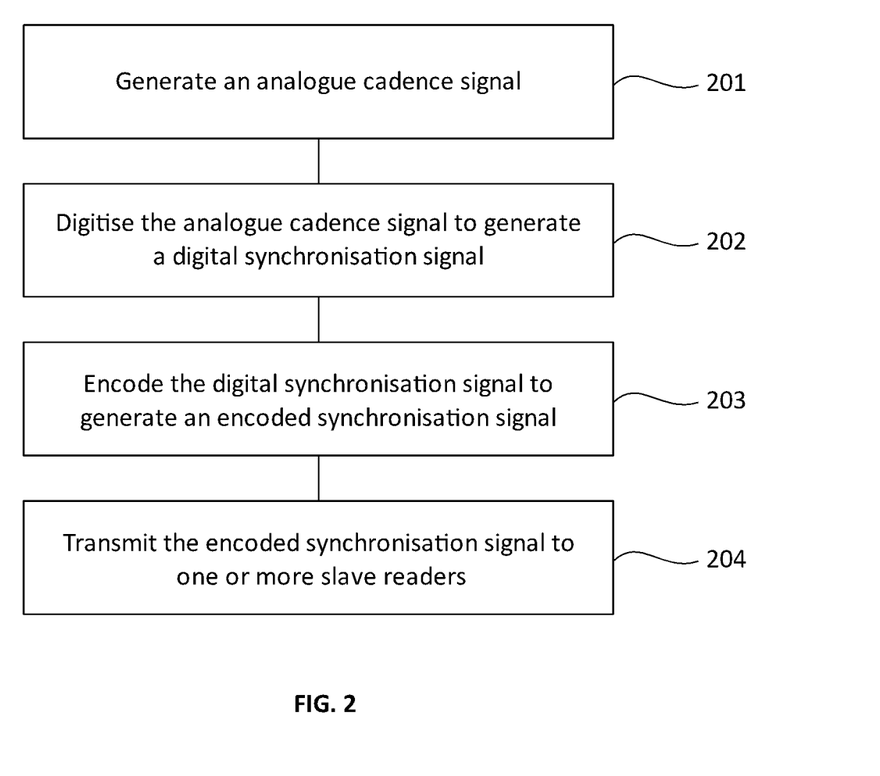
FIG. 2 shows an example approach for generating a synchronisation signal.

FIG. 2 shows an example approach for generating a synchronisation signal.

At step 201, an analogue cadence signal is generated. This typically occurs at a master reader. The purpose of an analogue cadence signal is to determine when an electronic animal tag reader should be in a transmit mode or a receive mode.

The analogue cadence signal may have a predetermined period. For example, the period may be about 60 ms or about 100 ms. This period therefore maps to the time it takes for a reader to complete one transmit mode and one receive mode. A high part of the analogue cadence signal corresponds to the transmit mode and a low part of the analogue cadence signal corresponding to the receive mode. The ratio between these may be selected from a set of predetermined cadences. For example, the ratio of receive to transmit may be one of 80:20, 50:50, or 40:20.

This analogue cadence signal may be used directly at the master reader to control its own transmit mode and receive mode.

The analogue cadence signal may be generated by a cadence signal generator at the master reader. For example, this may be an oscillator, such as a voltage-controlled oscillator.

At step 202, the analogue cadence signal is digitised to generate a digital synchronisation signal.

This may be performed by an analogue-to-digital converter at the master reader, which may be implemented as an integrated circuit. A sampling rate may be set based a desired accuracy and/or the period of the analogue cadence signal. A sampling rate of 1 kHz may be sufficient for a 100 ms cadence signal.

In some embodiments, the digital synchronisation signal may be generated directly, without an analogue cadence signal being generated first. For example, this may be generated by a processor at the master reader based on a hardware cadence signal generator, such as a local oscillator. Where the cadence signal generator is running at a higher frequency than the digital synchronisation signal, the digital synchronisation signal may be generated by dividing down the signal of the local oscillator.

At step 203, the digital synchronisation signal is encoded to generate an encoded synchronisation signal.

The encoding may involve determining a period and/or a cadence based on the digital synchronisation signal and encoding these into bytes representing the signal. The encoded synchronisation signal may therefore be significantly smaller in data size than the digital synchronisation signal.

The encoded synchronisation signal may be a byte sequence (that is, a sequence of 8-bit bytes). A first part of the encoded synchronisation signal may be a predetermined synchronisation sequence to indicate the start of the encoded synchronisation signal and thus to synchronise the time at which the cadence should begin. This may be a predetermined sequence which is correlated to the system of readers. This can allow two master readers operating within a same geographical area to separately set the cadence for its system of slave readers: each slave reader may only act on a synchronisation signal having the particular synchronisation sequence.

A second part of the encoded synchronisation signal may be a cadence sequence. This may be a sequence of byte indicating the cadence ratio and/or the cadence period.

In some cases, the cadence sequence is an index of a cadence dictionary. The cadence dictionary is a map from an index to a particular cadence ratio and/or period. For example, a first index in the cadence dictionary may correspond to a 100 ms period having a receive-to-transmit ratio of 80:20, and a second index in the cadence dictionary may correspond to a 60 ms period having a receive-to-transmit ratio of 40:20. The cadence dictionary may be stored at the master reader and each slave reader in advance.

In other cases, the cadence sequence directly encodes the cadence ratio and/or period. For example, a first sequence of bytes of the cadence sequence may relate to an integer number of milliseconds of the period, a second sequence of bytes of the cadence sequence may relate to the period of the receive mode, and a third sequence of bytes of the cadence sequence may relate to the period of the transmit mode.

The encoding may further comprise including a checksum or redundancy information to ensure that the encoded synchronisation signal, and the information it contains, is correctly received by a recipient.

The encoded synchronisation signal may further include other information related to the master reader. For example, this may include a mode of the master reader or how the original analogue cadence signal was synchronised. If the master reader has a GNSS lock, such that the analogue cadence signal is synchronised via GNSS, this may be indicated in the encoded synchronisation signal.

The encoding may be performed at a signal encoding module at the master reader. The signal encoding module may be a hardware circuit configured to perform the encoding. Alternatively, the signal encoding module may be a series of instructions executable by a processor of the master reader to perform the encoding.

At step 204, the encoding synchronisation signal is transmitted to one or more slave readers.

This may occur through an appropriate technology, such as a suitably configured IEEE 802.11 or other suitable wireless transmission protocol. The range of transmission may be configured to be received by a slave reader within a predetermined range of the master reader, such as 1 km.

This may occur through a synchronisation signal transmission module of the master reader. The transmission module may be a hardware circuit configured to perform the transmission via an antenna. Alternatively, the transmission module may be a series of instructions executable by a processor of the master reader to transmit the data over the antenna.

Figure 3:
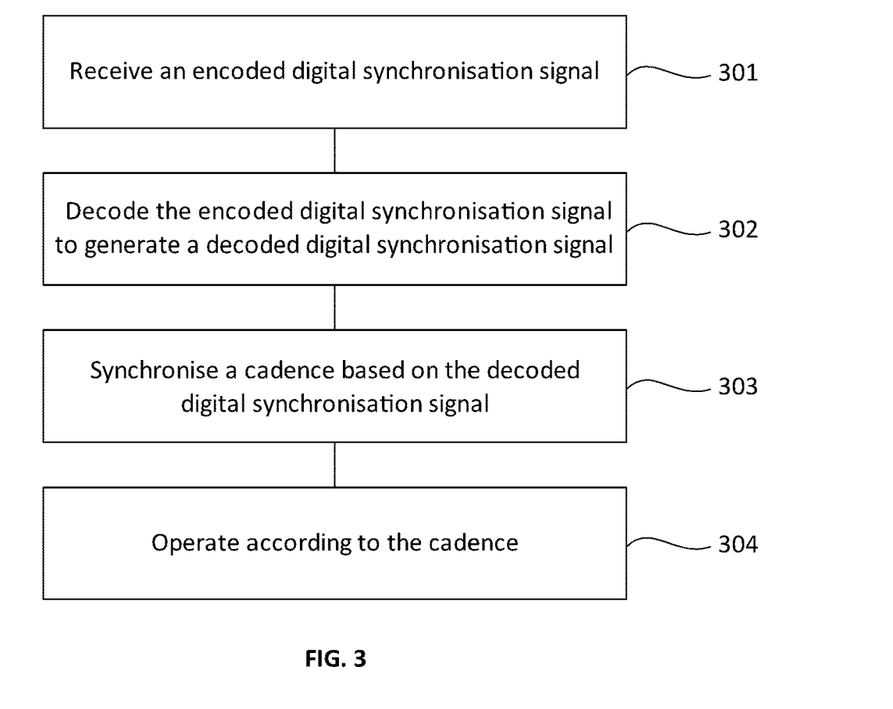
FIG. 3 shows an example approach for a reader to be synchronised based on a synchronisation signal.

FIG. 3 shows an example approach for a reader to be synchronised based on a synchronisation signal.

At step 301, the encoded digital synchronisation signal is received by a reader.

This may occur at a synchronisation signal receiver module of the reader. The synchronisation signal receiver module may be a hardware circuit configured to perform the receiving via an antenna. Alternatively, the synchronisation signal receiver module may be a series of instructions executable by a processor of the slave reader to receive the data over the antenna.

Receiving the encoded digital synchronisation signal may further include verifying that the encoded digital synchronisation signal was correctly received.

At step 302, the encoded digital synchronisation signal is decoded to generate a decoded digital synchronisation signal.

This may occur by identifying a start time for a cadence. This may be the time at which the decoded digital synchronisation signal is available. Alternatively, the start time may be an estimate of the time at which the analogue cadence signal was generated at step 201, and therefore may be calculated from the time at which the decoded digital synchronisation signal is available to account processing and transmission delays.

In addition, decoding may comprise extracting a cadence ratio and/or period from the encoded digital synchronisation signal, and in particular, from the cadence sequence.

Where a unique synchronisation sequence is used for the master reader, the slave reader may determine that the synchronisation sequence of the encoded digital synchronisation signal matches a predetermined synchronisation sequence. If there is no match, the slave reader may omit further steps.

The decoding may be performed at a signal decoding module at the slave reader. The signal decoding module may be a hardware circuit configured to perform the decoding. Alternatively, the signal decoding module may be a series of instructions executable by a processor of the slave reader to perform the decoding.

At step 303, a cadence is synchronised based on the decoded digital synchronisation signal.

In this context, a cadence comprises a transmit period and a receive period corresponding to when the reader should be in a transmit mode and a receive mode respectively.

Synchronising the cadence may involve determining a transmit period and a receive period based on the cadence ratio and period. For example, a cadence period of 100 ms and a cadence ratio of 80:20 indicates that the reader should have a transmit period of 20 ms and a receive period of 80 ms. These may be measured from the start time for a cadence.

This may further involve updating a cadence signal generator at the slave reader based on the cadence period of the decoded digital synchronisation signal. For example, this may be an oscillator, such as a voltage-controlled oscillator.

This may be performed by a cadence synchronisation module at the slave reader. The cadence synchronisation module may be a hardware circuit configured to perform the synchronising, for example by interacting with the cadence signal generator. Alternatively, the cadence synchronisation module may be a series of instructions executable by a processor of the slave reader to perform the synchronisation.

At step 304, the reader operates according to the cadence.

In this way, the reader may enter a transmit mode according to the transmit period and may enter a receive mode according to the receive period.

Because there are synchronised to the master reader, the reader should have a transmit period and a receive period at approximately the same time as every other reader synchronised to the master reader.

This reduces interference between a reader transmitting while another reader is receiving.

In some cases, the reader may determine not to synchronise a cadence based on the decoded digital synchronisation signal. This determination may be based on other information provided in the encoded digital synchronisation signal. If the information indicated that the master reader does not have a GNSS lock, while the slave reader does have a GNSS lock, the slave reader may determine that the cadence should be synchronised using GNSS.

The methods shown in FIGS. 2 and 3 provide a robust approach for synchronising the cadence of one or more slave readers with a master reader. This reduces interference and improves the reliability and accuracy of reading. In addition, because the synchronisation signal is digitally encoded, it has been found that the synchronisation signal can be received by a slave reader even where there is significant interference from other signals. This allows the synchronisation signal to be used for readers a greater distance apart.

GNSS Synchronisation

Some readers have a cadence signal generator which is configured to maintain a cadence. For example, an oscillator, such as a voltage-controlled oscillator, can be used to maintain a period of the cadence. By setting the oscillator to have a predetermined cadence, the reader may have a regular transmit period and receive period. It can therefore be important to synchronise the cadence of the cadence signal generator, to avoid one reader's transmit mode interfering with another reader's receive mode.

As noted above, a slave reader may be synchronised with a master reader. However, it may be useful to include an alternatively approach, in cases where a synchronisation signal from the master reader is unavailable. For example, due to atmospheric conditions, the distance a signal can travel may be lower than expected, and so the master reader's synchronisation signal may no longer be received by the slave reader.

In addition, it may be useful to synchronise the master reader's cadence according to an external source. This can allow multiple master readers to be synchronised, and thus for reader systems to have a larger geographical spread.

One approach is to use a pulse generated by a GNSS receiver. A GNSS receiver is configured to receive readings from a Global Navigation Satellite System (GNSS), such as GPS, GLONASS, BeiDou, or Galileo. Each GNSS system has a number of satellites which transmit a signal at a regular period, controlled by highly accurate atomic clocks. Based on the receipt of the signals from multiple satellites, a user can determine their position. However, due to the precise timing of the signals, these can be used to generate a pulse at a regular interval. This is highly precise, as it is synchronised to the satellites.

A GNSS receiver can therefore produce a pulse in synchrony with any other GNSS receiver. By synchronising the cadence of the readers to the pulse generated by a GNSS receiver, the cadence of each readers is therefore synchronised with each other.

This may be used by a master reader in order to synchronise its cadence signal generator and/or to generator an analogue cadence signal. Since slave readers may be synchronised with the master reader ultimately using the analogue cadence signal, slave readers can be synchronised indirectly using a pulse from a GNSS receiver.

In other cases, this approach may be used in a slave reader as a backup or an alternative to the synchronisation signal from the master reader. This can enhance the accuracy or resilience of a reader system, since the master reader is no longer a single point of failure.

The approach may also be used by a reader that is not in a master-slave arrangement. Multiple readers can operate in synchrony without directly communicating by relying on a pulse from a GNSS receiver.

Figure 4:
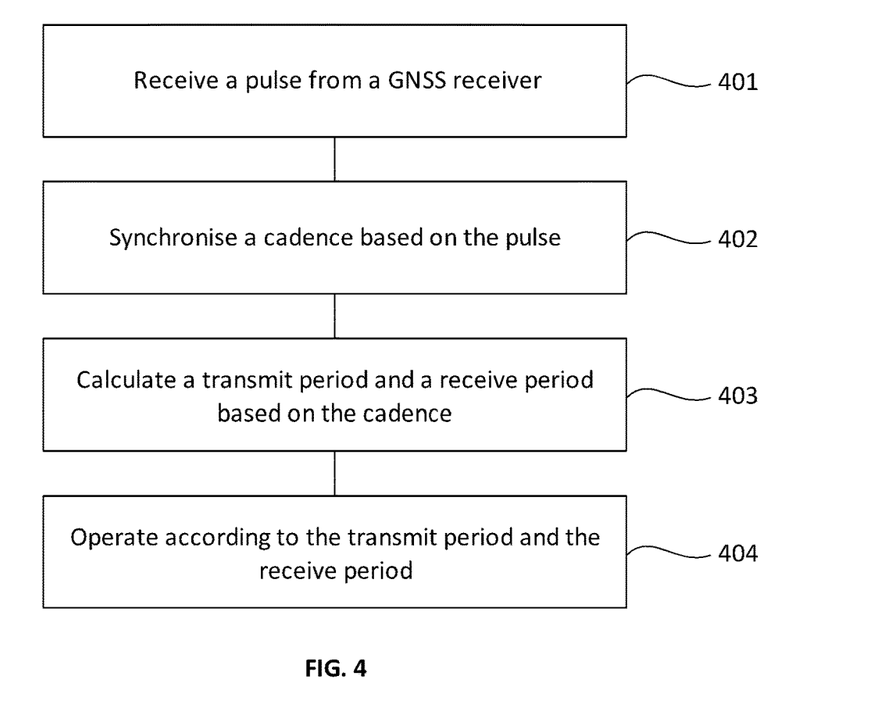
FIG. 4 shows an example approach for synchronising a reader based on GNSS.

FIG. 4 shows an example approach for synchronising a reader based on GNSS.

At step 401, a pulse is received from a GNSS receiver.

The pulse is output from the GNSS receiver at a regular period, such as every second. This can be transmitted to the reader, for example through a connection from a pulse output of the GNSS receiver to an input of the reader. The pulse may have a predetermined duration, such as 100 ms.

At step 402, a cadence is synchronised based on the pulse.

In this context, a cadence comprises a transmit period and a receive period corresponding to when the reader should be in a transmit mode and a receive mode respectively.

Synchronising the cadence may involve setting a start of the cadence (or the start of the transmit period) based on the start of the pulse. This may further involve updating a cadence signal generator at the reader based on the cadence period of the decoded digital synchronisation signal. For example, this may be an oscillator, such as a voltage-controlled oscillator.

This may be performed by a cadence synchronisation module at the reader. The cadence synchronisation module may be a hardware circuit configured to perform the synchronising, for example by interacting with the cadence signal generator and the GNSS receiver. Alternatively, the cadence synchronisation module may be a series of instructions executable by a processor of the reader to perform the synchronisation.

In some cases, this cadence period is an integer multiple of the period of the pulse. This allows for the cadence period to be synchronised after an integer number of periods.

Where the cadence period is not an integer multiple of the period of the pulse, an offset may be applied to pulses to accommodate this. For example, an integer number of 60 ms cadence periods do not fit into a 1 s pulse period. Thus, a first cadence period may be synchronised with a first pulse, since they both occur at a nominal start time (such as midnight). The sixteenth cadence should occur 960 ms from the start time and the seventeenth period occurs 1020 ms from the start time. Neither of these align with the second pulse which should occur 1000 ms from the start time. Thus, synchronisation using the second pulse may be based on the sixteenth cadence plus an offset of 40 ms. Similarly, synchronisation using the third pulse may be based on the thirty-third cadence plus an offset of 20 ms. The fiftieth cadence and the fourth pulse then co-occur.

By using an offset in this manner, a pulse can be synchronised to any cadence period, even where the start of a cadence does not always co-occur with the start of a pulse.

At step 403, a transmit period and a receive period are calculated based on the cadence.

The transmit period corresponds to a period during which the reader is in a transmit mode, and the receive period corresponds to a period during which the reader is in a receive mode. The duration and relative timing of these may be set in advance according to a cadence period and a cadence ratio.

Because the cadence is set based on the pulse, the transmit period and receive period are consequently indirectly calculated based on the pulse.

This may occur at a cadence calculation module at the reader. The cadence calculation module may be a hardware circuit configured to perform the calculating. Alternatively, the cadence calculation module may be a series of instructions executable by a processor of the reader to perform the calculation.

At step 404, the reader operates according to the transmit period and the receive period.

In the transmit period, the reader is in a transmit mode. The reader transmits an excitation signal. This may be transmitted to an electronic animal identification tag attached to an animal, with a view to energising the tag.

In a receive period, the reader is in a receive mode. The reader monitors for signals from tags. In this mode, the reader may receive a signal from an energised tag attached to an animal.

In this way, multiple readers may be synchronised (that is, enter their transmit mode and receive mode) in synchrony by relying on a GNSS receiver. This reduces the chance of one reader's transmit mode interfering with another reader's receive mode, and may provide a more reliable reader system.

In some embodiments, a slave reader may selectively synchronise its cadence based on a synchronisation signal from a master reader or from a GNSS receiver. In some cases, the cadence is primarily synchronised based on the GNSS receiver. The synchronisation signal from a master reader may only be used if the GNSS receiver is unable to output a signal (for example, due to atmospheric conditions). In other cases, the synchronisation signal from the master reader is the primarily used for synchronisation. However, if the master reader synchronisation signal has not been synchronised with a GNSS receiver (or in other words, the master reader does not have GNSS lock), the slave reader may switch to synchronising with the GNSS receiver.

This improves the resilience of the slave readers. By providing redundant synchronisation methods, the slave reader can continue to function even parts of the system are malfunctioning.

Error Correction

In the approaches noted above, a cadence at a reader may be synchronised from time to time. For example, using a GNSS receiver, the cadence at a reader may be synchronised every second.

However, the cadence period is often significantly shorter than this, for example 100 ms or 60 ms. This cadence is controlled by a cadence signal generator, such as a voltage-controlled oscillator at the reader.

It is common for cadence signal generators to drift over time. For example, each cadence period, the cadence period tends to grow or shrink, depending on the characteristics of the cadence signal generator. For example, in some cases, the cadence period may grow by 10 ms each 1 s.

This drift may be different for each reader. Because of this drift accumulating over time, readers tend to fall out of synchrony. Eventually this can lead to the reader system being inoperable due to excess interference between readers.

Synchronising the signals of readers frequently can avoid excessive accumulated drift. However, if this synchronisation is unavailable (for example, if atmospheric conditions rendering cause GNSS signals unable to be used for synchronisation), this can prevent a reader system from operating.

One approach to mitigating this is to correction for the drift. This allows the local cadence signal (that is, the cadence signal from a cadence signal generator) to remain relatively close to a reference cadence signal (that is, the cadence of the synchronisation signal from the master reader, or the pulse from a GNSS receiver) for a longer time.

Figure 5:
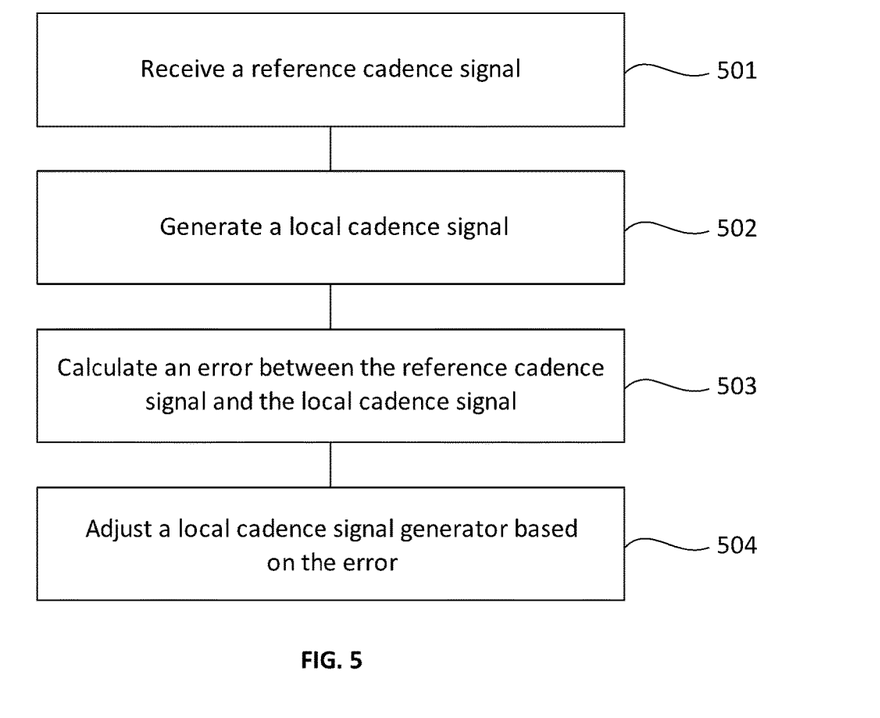
FIG. 5 shows an example method for how to improve the accuracy of a cadence signal generator.

FIG. 5 shows an example method for how to improve the accuracy of a cadence signal generator.

At step 501, a reference cadence signal is received.

Where the method is performed by a master reader or a standalone reader (that is, one which does not operate in a master-slave arrangement), the reference cadence signal may correspond to the pulse generated by a GNSS receiver.

Where the method is performed by a slave reader, the reference cadence signal may correspond to the pulse generated by a GNSS receiver or to the synchronisation signal transmitted by the master reader.

This may occur during the ordinary operation of the reader. For example, the reference cadence signal may be received for synchronisation.

Where a synchronisation signal is received from a master reader, this may occur at a synchronisation signal receiver module of the reader. The synchronisation signal receiver module may be a hardware circuit configured to perform the receiving via an antenna. Alternatively, the synchronisation signal receiver module may be a series of instructions executable by a processor of the reader to receive the data over the antenna.

At step 502, a local cadence signal is generated.

This is generated by a cadence signal generator at the reader, such as a voltage-controlled oscillator. This may occur during the ordinary operation of the reader. For example, a local cadence signal may be generated to determine the transmit period and receive period of the reader.

Typically, this occurs before a synchronisation of the cadence signal generator occurs. This is because, immediately after synchronisation, the reference cadence signal and the local cadence signal should be substantially the same.

At step 503, an error between the reference cadence signal and the local cadence signal is calculated. This may occur by calculating an absolute time difference between the start of a period according to the local cadence signal and the start of a period according to the reference cadence signal.

The local cadence signal and reference cadence signal may be of different periods. For example, the local cadence signal may correspond to a 100 ms cadence while the reference cadence signal may correspond to a 1 s pulse. In this case, the error is calculated based on when the start of each signal should occur at the same time (for example, after 10 cadences).

This may occur at an error calculation module of the reader. The error calculation module may be a hardware circuit configured to perform the calculation. Alternatively, the error calculation module may be a series of instructions executable by a processor of the reader to perform the calculation.

At step 504, the local cadence signal generator is adjusted based on the error. This is to minimise the difference between the reference cadence signal and the local cadence signal (or in other words, to minimise the error that may be computed in a subsequent performance of step 503). Minimising in this case may mean reducing the error to below an acceptable error threshold. For a 100 ms cadence period, an acceptable error may be 250 μs, and so the adjustment aims to reduce the error below 250 μs.

In some cases, the local cadence signal generator is adjusted to generate a local cadence signal earlier or later based on the error. This may be a fraction of the error (such as 50% of the error), to allow for incremental change. For example, if the calculated error is 10 ms per cadence period (that is, the local cadence signal is 10 ms later than the reference cadence signal), the local cadence signal generator may be adjusted so that a subsequent local cadence signal is generated 5 ms earlier. This would be expected to reduce the next calculated error to 5 ms.

In some cases, the adjustment occurs only if the calculated error is above a threshold. This avoids minimal adjustments being made when the local cadence signal and reference cadence signal align for practical purposes. For example, the adjustment may only occur if the error is above 150 μs.

This may occur at an error adjustment module of the reader. The error adjustment module may be a hardware circuit configured to perform the adjustment. Alternatively, the error adjustment module may be a series of instructions executable by a processor of the reader to perform the adjustment.

In this way, over time the accumulation of the drift is minimised by the error-based adjustment of the cadence signal generator.

Where this approach is used as a master reader or at a standalone reader, the reader may rely on a reference cadence signal corresponding to the pulse of a GNSS receiver. This approach allows the local cadence signal from the cadence signal generator to more closely match the reference cadence signal for longer. Since this is propagated to slave readers, this can allow the system as a whole to work more resiliently.

Where this approach is used at slave readers, a slave reader may rely on a reference cadence signal corresponding to a synchronisation signal from a master reader and/or a reference cadence signal corresponding to the pulse of a GNSS receiver. This approach allows the local cadence signal from the cadence signal generator to more closely match the reference cadence signal for longer. This avoids a reader from transmitting during another reader's receive period for longer; and therefore can allow the system as a whole to work more resiliently.

Reader

The approaches noted above may be implemented in a reader system comprising a number of readers.

Figure 6:
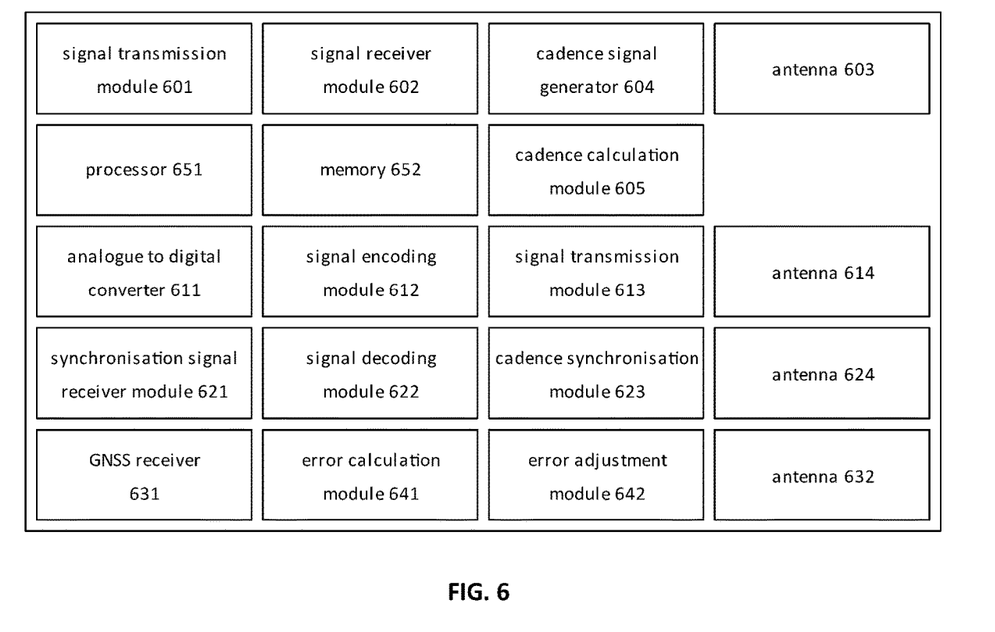
FIG. 6 shows an example reader.

An example such reader is shown in FIG. 6. A reader has a signal transmitter module 601 for transmitting a signal to an electronic animal identification tag and a signal receiver module 602 for receive a signal from an electronic animal identification tag. These may use an antenna 603 (or may each use a separate antenna). The reader has a cadence signal generator 604, such as a voltage-controlled oscillator, configured to generate a cadence signal, and a cadence calculation module 605 for calculating a transmit period and a receive period based on the cadence signal.

A reader may further have an analogue-to-digital converter 611 for converting an analogue cadence signal to a digital synchronisation signal, a signal encoding module 612 for generating an encoded synchronisation signal, and a synchronisation signal transmission module 613 for transmitting an encoded synchronisation signal to a slave reader.

The synchronisation signal transmission module 613 may be in communication with an antenna 614 (though this may be the same as antenna 603). In some cases, the analogue-to-digital converter 611, the signal encoding module 612, the synchronisation signal transmission module 613, and the antenna 614 may be provided only on a reader intended to operate as a master reader.

A reader may further have a synchronisation signal receiver module 621 configure to receive an encoded digital synchronisation signal, a signal decoding module 622 configured to generate a decoded digital synchronisation signal, a cadence synchronisation module 623 configured to synchronise the cadence signal generator 604. The synchronisation signal receiver module 621 may be in communication with an antenna 624 (though this may be the same as antenna 603 or antenna 614)

A reader may further have a GNSS receiver 631 for receiving signals of a GNSS. The GNSS receiver 621 may be in communication with an antenna 632 (though this may be the same as antenna 603, antenna 614, or antenna 624).

A reader may further have an error calculation module 641 for calculating an error between a local cadence signal and a reference cadence signal, and an error adjustment module 642 for adjusting the cadence signal generator 604 based on an error.

One or more of the modules noted may be omitted in certain embodiments.

Although the modules have been shown as separate components, in some embodiments these are implemented in software. That is, computer-executable instructions corresponding to the functions performed by one of more of the modules are stored in a computer-readable medium, such as a memory 652 of the reader. One or more processors 651 of the memory can then execute the instructions, which perform the corresponding functions.

Interpretation

Where a series of steps has been described, these steps need not necessarily be performed in the stated order (unless context requires otherwise). That is, steps may be performed out of order or in parallel in different embodiments.

The term "comprises" and other grammatical forms is intended to have an inclusive meaning unless otherwise noted. That is, they should be taken to mean an inclusion of the listed components, and possibly of other non-specified components or elements.

The present invention has been illustrated by the description of some embodiments. While these embodiments have been described in detail, this should not be taken to restrict or limit the scope of the claims to those details. Additional advantages and modifications will readily appear to those skilled in the art. Therefore, the invention in its broader aspects is not limited to the specific details of the illustrative examples shown and described. Accordingly, modifications may be made to the details without departing from the spirit or scope of the general inventive concept.

The invention claimed is:

1. A method for reading an electronic tag attached to an animal, comprising:
   generating a synchronisation signal;
   encoding the synchronisation signal to generate an encoded synchronisation signal; and
   wirelessly transmitting the encoded synchronisation signal to one or more slave readers;
   wherein the method is performed by a master reader in communication with the one or more slave readers, each slave reader being an electronic animal identification tag reader configured to read an electronic animal identification tag attached to the animal;

wherein the encoded synchronisation signal comprises a byte sequence, wherein the byte sequence comprises a sequence for use in identifying the master reader, wherein the byte sequence comprises a sequence for use in identifying a start time of a cadence, and/or wherein the byte sequence comprises a cadence sequence for use in determining a ratio between a transmit period and a receive period and/or a period of a cadence.

2. The method of claim 1, further comprising:

wirelessly receiving the encoded synchronisation signal from the master reader; decoding the encoded synchronisation signal to obtain a decoded synchronisation signal;

synchronising a cadence based on the decoded synchronisation signal; and operating according to the cadence;

wherein the method is performed by the one or more slave readers, the one or more slave readers in communication with the master reader, the one or more slave readers being electronic animal identification tag readers configured to read the electronic animal identification tag attached to the animal.

3. The method of claim 2, wherein the method further comprises:

calculating the transmit period and the receive period based on the cadence;

during the transmit period, transmitting a signal to the electronic animal identification tag attached to the animal; and during the receive period, monitoring for a received signal from the electronic animal identification tag attached to the animal.

4. The method of claim 2, wherein synchronising the cadence comprises adjusting a cadence signal generated by a cadence signal generator.

5. The method of claim 1, wherein the cadence is based on a pulse received from a GNSS receiver.

6. A reader system, comprising:

a master reader comprising;

a synchronisation signal generator to generate a synchronisation signal;

a synchronisation signal encoder module configured to encode the synchronisation signal to generate an encoded synchronisation signal; and a synchronisation signal transmission module configured to wirelessly transmit the encoded synchronisation signal to one or more slave readers;

wherein the master reader is in communication with the one or more slave readers, each slave reader being an electronic animal identification tag reader configured to read an electronic animal identification tag attached to an animal;

wherein the encoded synchronisation signal comprises a byte sequence, wherein the byte sequence comprises a sequence for use in identifying the master reader, wherein the byte sequence comprises a sequence for use in identifying a start time of a cadence, and/or wherein the byte sequence comprises a cadence sequence for use in determining a ratio between a transmit period and a receive period and/or a period of a cadence.

7. The reader system of claim 6, further comprising:

wherein the one or more slave readers comprise:

a synchronisation signal receiver module configured to wirelessly receive an encoded synchronisation signal from the master reader;

a synchronisation signal decoding module configured to decode the encoded synchronisation signal to obtain a decoded synchronisation signal; and a cadence synchronisation module configured to synchronise a cadence based on the decoded synchronisation signal;

wherein the one or more slave readers are configured to read the electronic animal identification tag attached to the animal according to the cadence.

8. The system of claim 6, wherein the slave reader calculates the transmit period and the receive period based on the cadence;

during the transmit period, transmits a signal to the electronic animal identification tag attached to the animal; and during the receive period, monitors for a received signal from the electronic animal identification tag attached to the animal.

9. The system of claim 7, wherein synchronising the cadence comprises adjusting a cadence signal generated by a cadence signal generator.

10. The system of claim 6, where in the encoding further comprises including a checksum or redundancy information to ensure that the encoded synchronisation signal, and the information it contains is correctly received by the one or more slave readers.

11. A method, comprising:

receiving an encoded reference cadence signal;

decoding the encoded reference cadence signal;

generating a local cadence signal at a local cadence signal generator, the local cadence signal corresponding to a transmit period in which the signal is transmitted to an electronic animal identification tag and a receive period in which the signal from the electronic animal identification tag is monitored;

determining an error between the reference cadence signal and the local cadence signal; and adjusting the local cadence signal generator based on the error to minimize the difference between the reference cadence signal and the local cadence signal;

wherein the method is performed by an electronic animal identification tag reader configured to read the electronic animal identification tag attached to the animal;

wherein the encoded reference signal comprises a byte sequence, wherein the byte sequence comprises a sequence for use in identifying a master reader, wherein the byte sequence comprises a sequence for use in identifying a start time of the reference cadence, and/or wherein the byte sequence comprises a reference cadence sequence for use in determining a ratio between the transmit period and the receive period and/or a period of the reference cadence.

12. An electronic animal identification tag reader system comprising one or more animal identification tag readers comprising;

a synchronisation signal receiver module configured to wirelessly receive an encoded synchronisation signal from a master reader;

a synchronisation signal decoding module configured to decode the encoded synchronisation signal to obtain a decoded synchronisation signal; and a cadence synchronisation module configured to synchronise a cadence based on the decoded synchronisation signal;

wherein the encoded synchronisation signal comprises a byte sequence, wherein the byte sequence comprises a sequence for use in identifying the master reader, wherein the byte sequence comprises a sequence for use in identifying a start time of the cadence, and/or wherein the byte sequence comprises a cadence sequence for use in determining a ratio between a transmit period and a receive period and/or a period of a cadence.

\* \* \* \* \*

UNITED STATES PATENT AND TRADEMARK OFFICE
CERTIFICATE OF CORRECTION

| | | |
|---|---|---|
| PATENT NO. | : 12,144,320 B2 | Page 1 of 1 |
| APPLICATION NO. | : 17/429597 | |
| DATED | : November 19, 2024 | |
| INVENTOR(S) | : Leigh Andrew Bateman, Benjamin Thomas John Wilkinson and Brian Antony Clayton | |

It is certified that error appears in the above-identified patent and that said Letters Patent is hereby corrected as shown below:

In the Claims

Claim 3, Column 1, Line 26:
"The method of claim 2, wherein the method further comprises:"
Should read:
--"The method of claim 1, wherein the method further comprises:"--

Signed and Sealed this
Eighteenth Day of February, 2025

Coke Morgan Stewart
*Acting Director of the United States Patent and Trademark Office*